March 19, 1929.  B. J. GOLDSMITH ET AL  1,706,026
VEHICLE WINDOW
Filed March 31, 1925   2 Sheets-Sheet 1

INVENTOR.
Bertram J. Goldsmith.
Emil Koeb.
BY Townsend + Decker
ATTORNEYS.

March 19, 1929.  B. J. GOLDSMITH ET AL  1,706,026
VEHICLE WINDOW
Filed March 31, 1925  2 Sheets-Sheet 2

INVENTOR.
Bertram J. Goldsmith.
Emil Koeb.
BY
ATTORNEYS.

Patented Mar. 19, 1929.

1,706,026

UNITED STATES PATENT OFFICE.

BERTRAM J. GOLDSMITH, OF NEW YORK, AND EMIL KOEB, OF TUCKAHOE, NEW YORK, ASSIGNORS, BY MESNE ASSIGNMENTS, TO THE ENGLISH & MERSICK COMPANY, OF NEW HAVEN, CONNECTICUT, A CORPORATION OF CONNECTICUT.

VEHICLE WINDOW.

Application filed March 31, 1925. Serial No. 19,578.

This invention relates to window mountings and more particularly to a ventilating mechanism constructed for cooperation therewith.

It is a primary object of the invention to provide a ventilating structure so designed that it can be safely left open in any usual weather but which can be closed entirely when desired.

It is a further object to provide a structure of the type referred to which can be easily controlled and which will not add unnecessarily to the number of parts employed.

Other and more specific objects will appear as the description proceeds.

Figure 1:
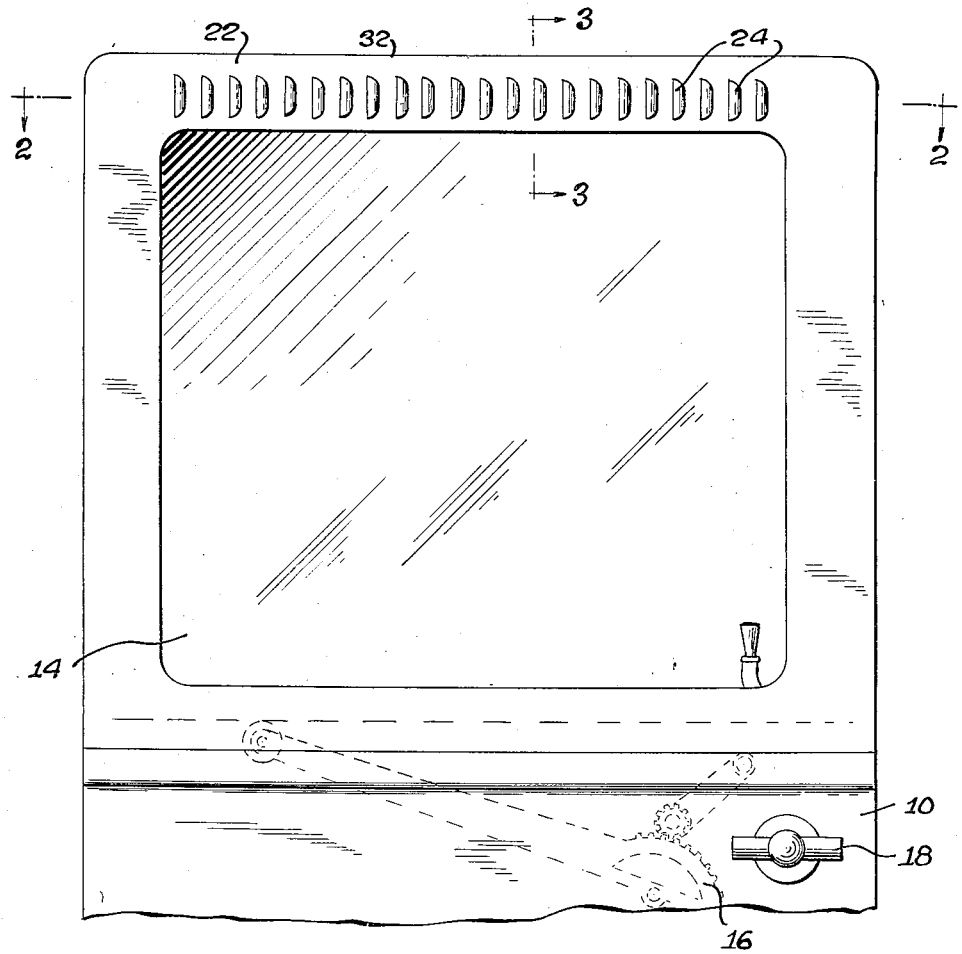
Fig. 1 is an external elevational view of an automobile door provided with our invention.
Figure 2:
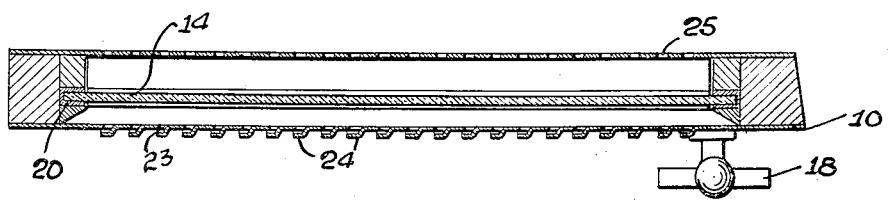
Fig. 2 is a section thereof on the line 2—2 of Fig. 1.
Figure 3:
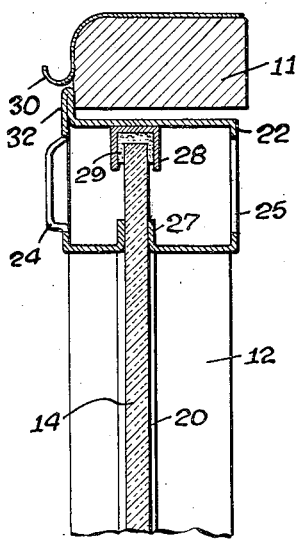
Fig. 3 is a section on the line 3—3 of Fig. 1 showing the ventilating passage closed.
Figure 4:
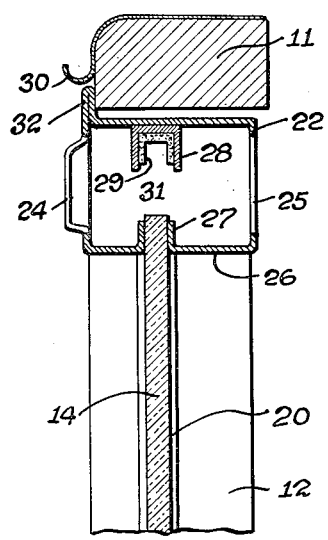
Fig. 4 is a similar section showing the ventilating mechanism open.

Referring to the details of the drawings there are shown certain portions of an automobile door 10, carried by the main frame 11 and provided with the usual window opening 12. The slidable window or other closure 14 is mounted on the door and is movable to a position to close the opening 12 or to leave the same unobstructed. The window 14 may be controlled by any desired form of window operator 16 shown in dotted lines in Fig. 1. The door may be held in closed position by the usual latch bolt 18 as will be understood by those skilled in the art. The above described structure forms no part of our present invention and may be constructed in any desired manner.

There has been experienced considerable difficulty in properly ventilating closed automobiles in certain kinds of weather as when it is raining or extremely cold and damp since an opening of the window 14 is disagreeable to the occupants of the car. The following structure has been developed with a view to entirely overcome this difficulty.

The part of the door frame surrounding the opening 12 and formed with the guides 20 for the window 14 carries the ventilating structure indicated generally at 22. This structure is preferably mounted above the window opening 12 as will appear more fully hereafter.

The ventilating structure 22 according to the form of the invention shown in Figs. 1 to 5 is formed as a hollow frame member having a series of openings 23 along the outer edge of the door, these openings, preferably stamped from the material thereof, being shielded by the rearwardly facing projections 24 so that as the car is moving forwardly the shielded openings will cause a constant suction out of the interior of the vehicle. The openings 25 on the inner face of the ventilating frame need not be protected but may be merely slotted openings as shown in the figures referred to. The body of the ventilating frame 22 is hollow thereby providing the air passage 31 connecting the inner and outer opening of the ventilating structure.

The lower member 26 of the frame 22 is formed with a slotted opening 27 through which the window 14 may pass and be received in the socket member 28 carried by the upper plate of the ventilating structure. The interior of the socket member 28 is preferably padded as indicated at 29 so as to form with the closure 14 an air-tight noiseless seal when the window is seated therein. The frame member 11 on which the door 10 is mounted is preferably provided with a drain trough 30 mounted above the abutment flange 32 of the door so as to reduce the likelihood of any moisture getting into the interior of the vehicle.

Figure 6:
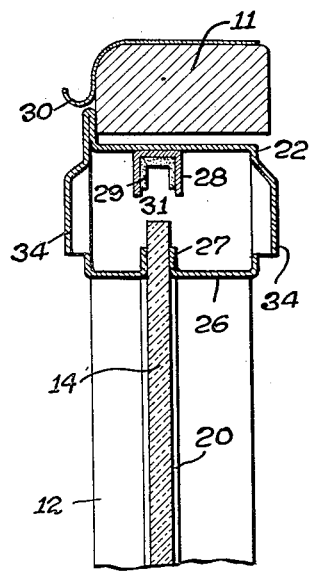
Fig. 6 is a vertical section similar to Fig. 3 showing a modification of our invention.
Figure 5:
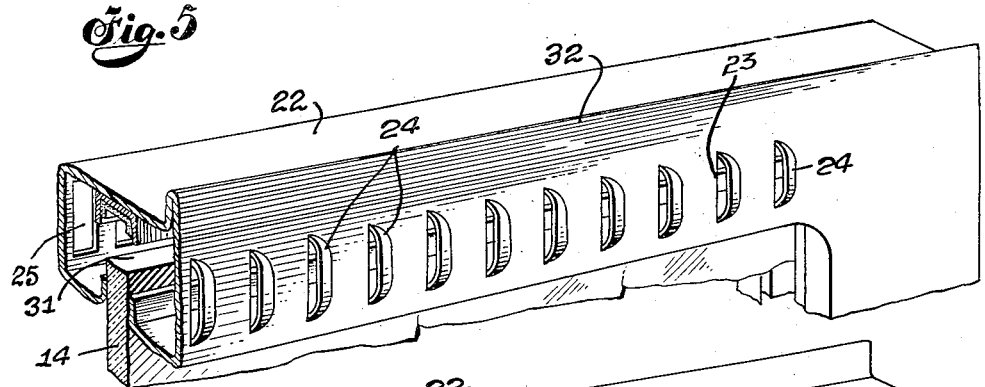
Fig. 5 is a perspective view partly in section of the structure shown in Figs. 1 to 4.
Figure 7:
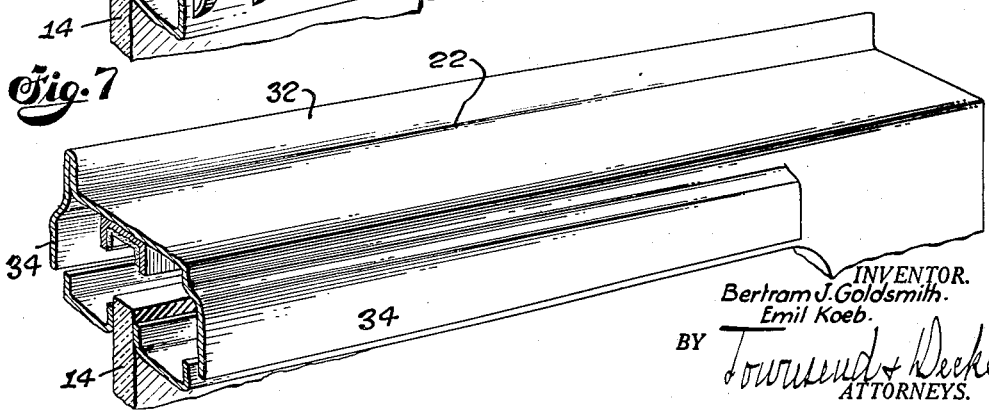
Fig. 7 is a perspective view thereof parts being in section.

The form of the invention shown in Figs. 6 and 7 is substantially the same as that shown in Figs. 1 to 5 except that the protecting shields 34 for the ventilating passage are punched from the material of the frame 22 to open downwardly. The inner and outer faces of the frame part 22 may be identical as shown although it is obvious that if desired the inner shielded opening may be replaced with any other form of opening or openings.

According to this form of the invention as in the first form the ventilating passage may be opened by lowering the window glass 14 in any usual weather without discomfort to the occupants of the vehicle.

The operation of the structure is believed to be clear from the above description. It is to be noted that the usual closure 14 for the window opening 12 which normally operates to open or close the window opening is arranged to move across the air passage 31 so that the one operator 16 controls the closure for the usual window opening and also the passage through the ventilator. This forms a very simple control for the ventilator requiring no additional moving parts. The passage way through the ventilating structure can be opened or closed to any desired degree, the tortuous path through which the circulating air passes deflecting the currents to prevent extreme drafts and to prevent the entrance of snow or rain.

While we have shown and described certain specific forms of the invention and have shown the same as applied to an automobile door it is obvious that the details thereof may be varied and that we are limited only as set forth in the appended claim.

We claim as our invention:

In a vehicle frame construction provided with a window opening, a cross member positioned above said window opening and formed as a hollow box-like sheet metal frame with communicating openings on the inner and outer faces thereof and with means for receiving and supporting a window in the lower portion thereof, said window being movable within said cross member to a position to close communication between said inner and outer openings or to a position entirely without said cross member, said outer openings being formed by having the material of the outer face of said cross member slitted vertically and stamped outwardly to provide rearwardly opening cup-shaped shield members and sealing means positioned within the interior of said cross member to receive said window when in closed position.

Signed at New York, in the county of New York and State of New York, this 30th day of March A. D. 1925.

EMIL KOEB.
BERTRAM J. GOLDSMITH.